Patented Feb. 16, 1932

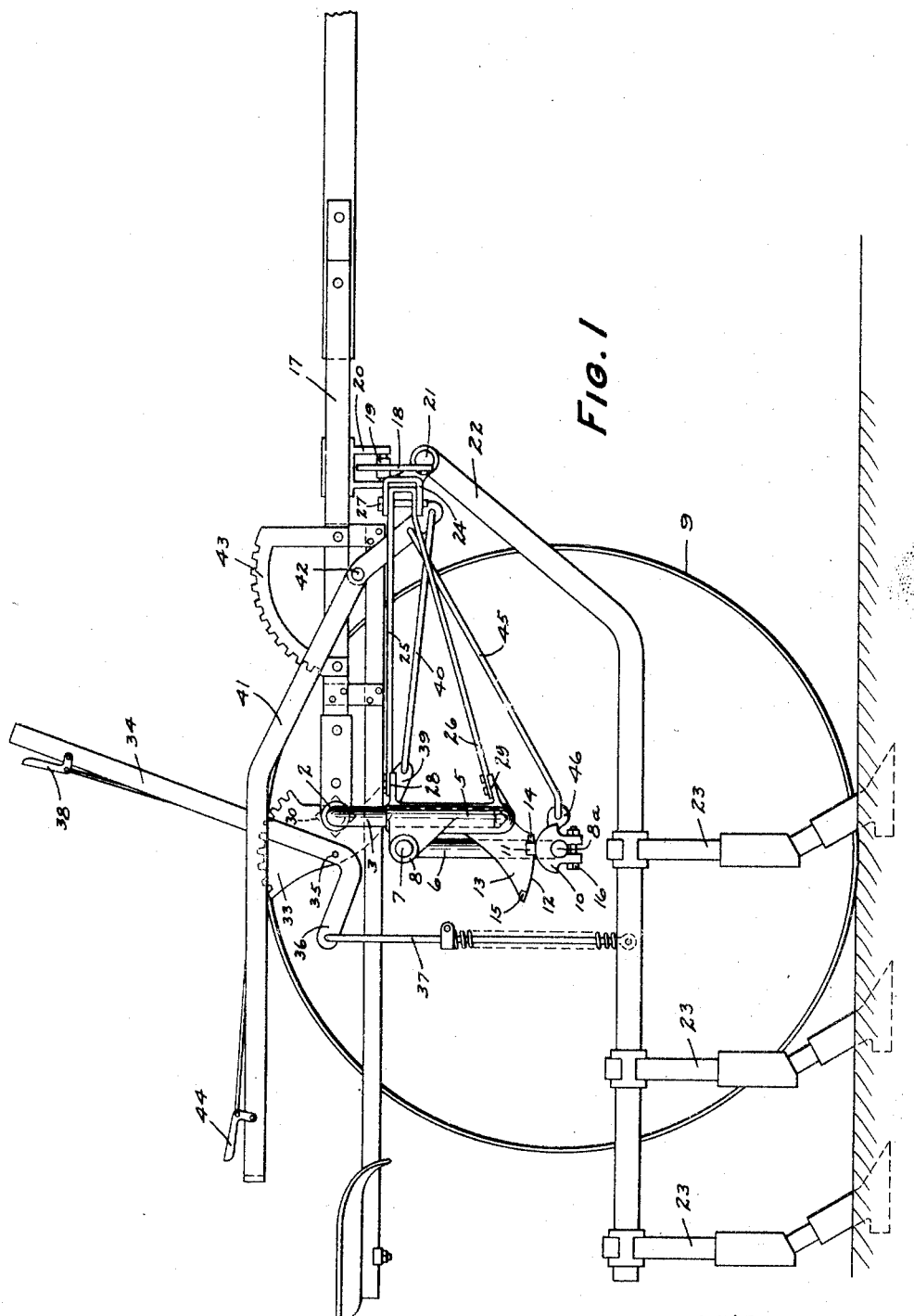

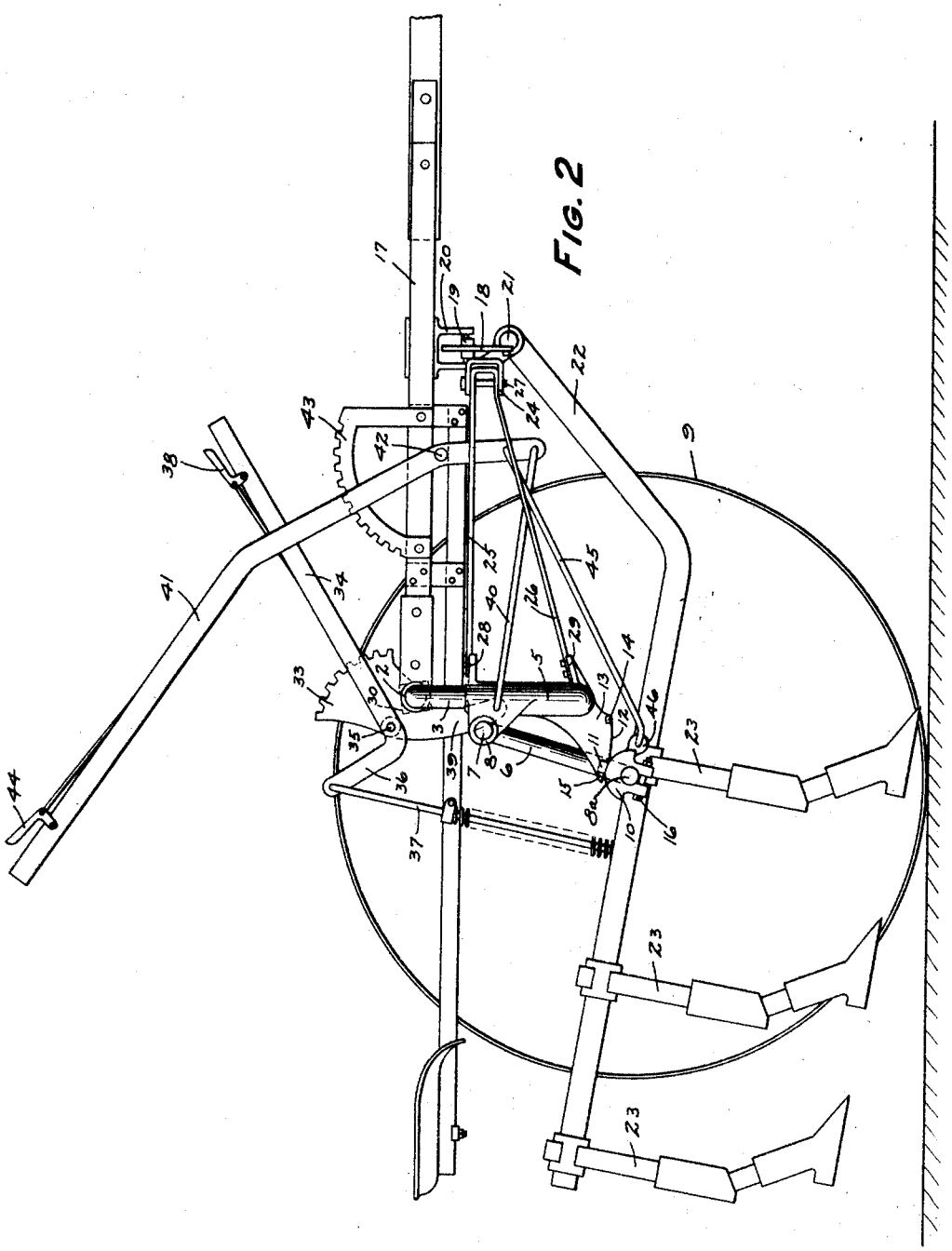

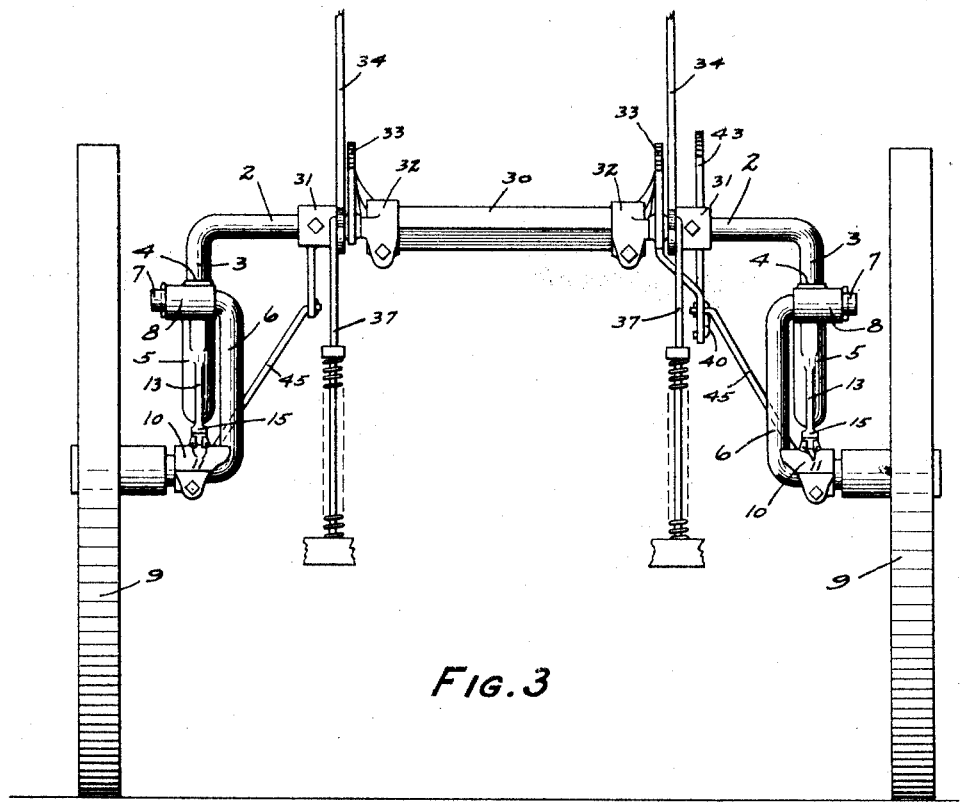
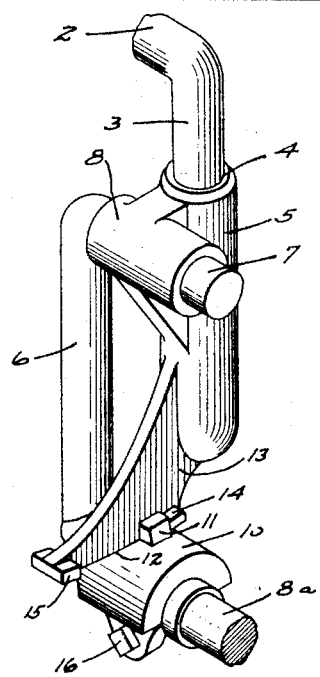

1,845,887

UNITED STATES PATENT OFFICE

THOMAS EDWIN ROSS AND JORGEN RAMSTAD, OF STILLWATER, MINNESOTA, ASSIGNORS TO THE STATE OF MINNESOTA

RIDING CULTIVATOR

Application filed May 22, 1930. Serial No. 454,879.

The invention relates to a cultivator of the one row riding type, and the primary object of our invention is to provide improved means for adjusting the carrying wheels relatively to the frame to balance it and simultaneously raise or lower the shovel beams, and accomplish this shifting of the wheels by a simple mechanism which will effect the desired wheel movement and raise and lower the beams, without, however, changing the position of the connection of the beams on or with the frame.

A further object is to provide a means for supporting the wheels on the shaft of the machine which will be comparatively simple and inexpensive in construction, but strong and durable and capable of withstanding rough usage to which an attachment or device of this kind may be subjected.

The invention consists generally in various constructions and combinations, all as hereinafter described and particularly pointed out in the claims.

In the accompanying drawings forming part of this specification,

Figure 1 is a side elevation of a riding cultivator embodying our invention, some of the details, as for instance, the spokes and hub of the wheels being omitted for clearness of illustration;

Figure 2 is a similar view showing the axle of the wheels moved backwardly to balance the frame and the cultivator beams in a raised position;

Figure 3 is a rear view showing the relative position of the cross shaft and the wheel axles;

Figure 4 is a perspective view showing the details of the connection between the wheels and axles and the cross shaft of the machine.

In the drawings, 2 represents the cross shaft of the machine having downwardly turned end portions 3. These end portions are inserted into cylindrical sockets 4 provided in sleeves 5, the lower ends of the parts 3 having thrust bearings in the bottom of the sockets as indicated by dotted lines in Figure 1. 6 represents the wheel axles arranged in an upright position on each side of the machine, each having an outwardly turned upper end 7 that is journaled in the bearings 8 preferably formed integrally with the sleeve 5, although of course it may be made separately and secured to the sleeve, if preferred. These bearings are horizontal on each side of the machine, the ends 7 being parallel with the horizontal portion of the shaft 2 and the axles 6 are free to swing in the bearings 8, having a limited forward and backward movement thereon. The lower ends of the axles 6 have outwardly turned portions 8ª parallel substantially with the ends 7 and terminating in spindles for the carrying wheels 9. When, therefore, the axles 6 are swung forward or backward, a corresponding movement will be imparted to the supported wheels. Collars 10 are secured to the horizontal end portions 8ª and each collar has a pair of lugs 11 thereon spaced apart a suitable distance and adapted to receive the curved lower edge 12 of webs 13 which extend downwardly and rearwardly from the sleeves 5 and are preferably integrally formed therewith, the sleeve 5, the bearings 8 and the web 13 being preferably cast in one piece. The collars are adapted to slide on the curved edge of the webs 13 guided by the lugs 11 and stops 14 and 15 are preferably mounted on said webs to limit the forward and backward movement of the lugs 11 and the corresponding stroke of the wheel axles. The relative position of the axles, the bearings 8 and the collars 10, is such that the axles will be guided in their forward and backward movement with a minimum of lost motion and whenever desired the bolts 16 securing the collars on the spindle ends of the axles may be adjusted so that the collars and axles will slide freely on the curved edges of the webs, while the operating parts are held in their proper relative position.

The pole 17 of the machine is connected by suitable means with the shaft 2 and a cross bar 18 is slidable on anti-friction rollers 19 carried by brackets 20 and a shaft 21 is secured to the downwardly turned ends of the bar 18 and forms a connection for the forward ends of the cultivator beams 22 upon which the cultivators 23 are mounted.

Brackets 24 are secured on the shaft 21 and straps 25 and 26 are pivotally connected at 27 with the brackets 24 and are rigidly secured at 28 and 29 to the upper and lower portions of the sleeves 5 and thereby the sleeves are rigidly held while permitting a limited lateral movement of the shaft 21, as in shifting the wheels on the depending vertical ends of the shaft 2 in steering the machine.

30 represents a sleeve mounted on the shaft 2 and free to rotate thereon but limited in its longitudinal movement by collars 31. Collars 32 are secured on the ends of this sleeve by suitable means and each collar is provided with a segment 33 rigidly mounted thereon. An operating lever 34 is pivoted at 35 on each quadrant and has an end extension 36 that has a link connection 37 with the cultivator beam beneath. The levers 34 are provided with the usual latch lock device 38 by means of which each lever may be locked with respect to its segment or each one may be moved independently of the other to raise or lower the cultivator beam with which it is connected. One of the segments 33 has a depending portion 39 and a link 40 pivotally connecting it with the lower end of a master lever 41 that is pivoted at 42 near a segment 43 and provided with the usual locking latch 44 by means of which the lever may be locked in any desired position on the segment. The connection 40 between the lever and the depending end of each segment 33 is preferably below the pivot 42 and when the lever 41 is moved, a corresponding movement will be imparted to the rigidly supported segment 33 to rock the sleeve 30, change the position of the segments and correspondingly move both of the operating levers 34 and the cultivator beams connected therewith. This will have the effect of raising or lowering the cultivator beams, depending on the direction of movement of the master lever 41.

Links 45 also connect the lower end of the lever 41 with ears 46 on the collars 10 so that when the lever 41 is operated to raise the cultivator beams, the collars 10 will be moved backward, oscillating the wheel axles 6 and moving them to the position in Figure 2, with the effect of balancing the frame and the load of the cultivators thereon.

In using the machine the rider may manipulate either of the secondary levers in the usual way for raising or lowering the cultivator beams independently of one another and whenever desired the master lever may be operated for the purpose of raising both of the cultivator beams and the cultivators thereon simultaneously and at the same time shifting the position of the supporting wheels with respect to the frame to balance the load and this shifting of the wheels will, from the mechanism above described, be effected without changing the position of the frame or the cross shaft with which the cultivator beams are connected.

In various ways the details of construction herein shown and described may be modified and still be within the scope of our invention.

We claim as our invention:

1. In a cultivator, a frame, a shaft having downwardly turned end portions, members having sockets to receive the depending ends of said shaft, axles journaled in bearings on said members and depending therefrom and adapted to swing forward and backward in said bearings, the lower portions of said axles having outwardly projecting spindles thereon and supporting wheels for said spindles, shovels and beams on said frame, collar members secured to said spindles, means below said bearings and having curved surfaces against which said collar members are adapted to slide, and means for moving said collar members and said axles backward and forward.

2. In a cultivator, a shaft having downwardly turned ends, a frame connected with said shaft, shovels and beams therefor connected with said frame, members having sockets to receive the depending ends of said shaft, normally vertically disposed axles having horizontal bearings on said members and free to oscillate forward and backward thereon, said axles having outwardly turned lower ends terminating in wheel spindles, and wheels therefor, webs depending from said members and having curved lower edges, and means mounted on the outwardly turned ends of said axles adapted to contact with and slide against the edges of said webs.

3. In a cultivator, a frame, a shaft having downwardly turned ends connected thereto, members having vertical sockets to receive said ends, bearings formed on said members and having horizontal bores therethrough, normally vertically disposed axles having outwardly turned ends fitting within said bores and free to oscillate therein, the lower ends of said axles being outwardly turned and terminating in wheel spindles, and wheels therefor, collars secured to said outwardly turned lower ends and having lugs thereon spaced apart, webs depending from said members and fitting between said lugs, whereby said collars and ends may be moved forwardly and backwardly thereagainst, and stops mounted on said webs between which said lugs have a limited movement.

4. In a cultivator, a frame, vertically arranged substantially U shaped axles having bearings mounted thereon for receiving the outwardly turned upper end wherein said axles have an oscillating forward and backward movement, the lower outwardly turned ends having wheel spindles thereon, webs positioned between the upper and lower ends of said axles, means mounted on said outwardly turned lower ends for contact with the under surfaces of said webs to slide thereagainst, a shaft, means associated with said webs wherein said shaft is supported, and means connected to said axles for shifting them forward and backward.

5. In a cultivator, vertically arranged axles having outwardly turned lower ends forming wheel spindles and wheels mounted thereon, the upper portions of said axles also having outwardly turned ends, a frame for said cultivator, brackets on said frame having horizontal bearings for the upper ends of said axles and wherein said axles are free to oscillate forward and backward, webs depending from said brackets and collars mounted on the outwardly turned lower ends of said axles and having bearings for the lower edges of said webs and adapted to slide forward and backward thereagainst.

6. In a cultivator, a frame, vertically arranged axles provided upon opposite sides of said frame having outwardly turned upper ends, and brackets wherein said ends are journaled, the lower ends of said axles having spindles thereon and wheels therefor, said brackets supporting said frame and having depending members, said axles having means secured thereon to engage said members and move freely forward and backward thereunder, whereby the relative position of said frame and wheels may be changed.

In witness whereof, we have hereunto set our hands this 16th day of May, 1930.

THOMAS EDWIN ROSS.
JORGEN RAMSTAD.